(12) United States Patent
Lai et al.

(10) Patent No.: US 8,712,894 B2
(45) Date of Patent: Apr. 29, 2014

(54) METHOD AND SYSTEM FOR EVALUATING/ANALYZING PATENT PORTFOLIO USING PATENT PRIORITY APPROACH

(75) Inventors: Kuei-Kuie Lai, Yunlin (TW); Fang-Pei Su, Yunlin (TW); Tsung-Hsien Kuo, Yunlin (TW)

(73) Assignee: National Yunlin University of Science and Technology, Yunlin (TW)

( * ) Notice: Subject to any disclaimer, the term of this patent is extended or adjusted under 35 U.S.C. 154(b) by 542 days.

(21) Appl. No.: 12/939,771

(22) Filed: Nov. 4, 2010

(65) Prior Publication Data

US 2012/0116989 A1 May 10, 2012

(51) Int. Cl.
*G06F 3/14* (2006.01)
*G06F 17/30* (2006.01)
*G06F 7/06* (2006.01)

(52) U.S. Cl.
USPC .............................. 705/36 R; 715/227; 707/5

(58) Field of Classification Search
CPC ............................ G06Q 50/184; Y10S 707/93
USPC .................................................... 705/1, 36 R
See application file for complete search history.

(56) References Cited

U.S. PATENT DOCUMENTS

| 2007/0073748 A1* | 3/2007 | Barney ........................ 707/101 |
| 2007/0208719 A1* | 9/2007 | Tran ................................. 707/3 |
| 2009/0019355 A1* | 1/2009 | Jiang et al. .................... 715/227 |
| 2009/0132496 A1* | 5/2009 | Chen et al. ........................ 707/3 |
| 2010/0114587 A1* | 5/2010 | Masuyama et al. ............ 705/1.1 |

* cited by examiner

Primary Examiner — Lindsay M Maguire
Assistant Examiner — Hao Fu
(74) Attorney, Agent, or Firm — Muncy, Geissler, Olds & Lowe, P.C.

(57) ABSTRACT

A method and a system for evaluating/analyzing patent portfolio using patent priorities are provided for selecting a patent family to establish a data set based on members of the patent family and priorities claimed by the members, forming a relationship matrix based on the members and the priorities claimed by the members in the data set and at last, and analyzing a relationship between the members of the patent family and the priorities claimed by the members of the patent family through the relationship matrix to form an analysis result and then, performing patent evaluation patent portfolio according to the analysis result. Accordingly, a patentee having numerous patents may quickly know what patents have high importance, high value and high techniques and the patentee or his competitor is facilitated to perform patent evaluation, patent portfolio, patent application and patent maintenance.

15 Claims, 9 Drawing Sheets

METHOD AND SYSTEM FOR EVALUATING/ANALYZING PATENT PORTFOLIO USING PATENT PRIORITY APPROACH

BACKGROUND OF THE INVENTION

1. Field of the Invention

This invention relates to methods for evaluating patent portfolio and related systems, and more particularly, to a method for analyzing relationship between patent family member and its claimed priority to evaluate patent portfolio, and a related system.

2. Description of Related Art

While a company faces many competitors, besides increasing research budget, a method for raising competitiveness of itself by transforming intangible technique idea to patent is quite important. If the company would enter a market of some products, it should perform patent portfolio with respect to the products first. Besides understanding techniques of the competitor to avoid infringement, the company may clearly know what's its core techniques and focus on developing the core techniques, thereby enhancing its patent territory and obtaining great benefits.

The so-called patent portfolio is to file patent applications around with plan and purpose and to form patent family based on all relevant patent applications at each place. Generally, if a company lacks perfect patent portfolio, the patent enforcing effect may decrease. When the company cooperates with other enterprises, poor patent portfolio may result in decreased licensing counter. Furthermore, relevant techniques have difficult to continue innovation or realize its marker value. Hence, in terms of company technique research or market development later, well patent portfolio will generate more benefits.

The utilization of the previously mentioned patent family is very wide. It may realize market value of portfolio of other companies through patent family. Furthermore, value of the patent may be clearly known through patent family. Generally, if a patent is not important, a company dose not have to spend huge money for global patent portfolio, that is, the size of patent family members is one of indications of that if the patent is important or not. Moreover, when a patent is proceeding licensing or transaction, it will facilitate to raise negotiation counter if patent portfolio spans many countries.

Citation relationship is discussed in prior patent portfolio. When there is a citation relationship between a plurality of patents, it may construct patent citation network (PCN). Of course, it comprises self-citation of the same company and mutual citation of different companies therein. It may observe that patent citation condition and its market value through PCN, wherein a patent being frequently cited often has more benefits. Additionally, observing network structure of patent citation may know that which of company cites some patents or the condition that some patent is cited by its own company or other companies and therefore, may not only know the importance of patent but also judge development tendency of patent techniques.

However, patent citation is under consideration of discussing citation relationship between patents in a view of external analysis point. Using PCN for analysis may observe and know possible market value of patents of a company while there still exists a troublesome problem that it is uncertain whether patent may be transformed to effective financial capital or not.

In conclusion, a single patent has lower value and is hard to be evaluated for its overall usefulness. In contrast, it clearly judges current development situation and future direction of some technique field better through portfolio of a plurality of patents. Therefore, it is an important issue for a company to find out patent portfolio with high value, high importance and high techniques so as to perform patent licensing, strategy alliance and even to discover potential infringers.

SUMMARY OF THE INVENTION

In view of the above-mentioned problems of the prior art, it is a primary objective of the present invention to provide a method for evaluating/analyzing patent portfolio using patent priority. The method comprises steps of (1) selecting a patent family to establish a data set based on members of the patent family and priorities claimed by the members of the patent family, (2) forming a relationship matrix based on the members of the patent family and the priorities claimed by the members of the patent family in the data set and, (3) analyzing a relationship between the members of the patent family and the priorities claimed by the members of the patent family through the relationship matrix to form an analysis result, and performing patent evaluation or patent portfolio according to the analysis result.

In a preferable embodiment, the above-described step (1) further comprises (1-1) selecting one of a plurality of litigation case data that has a largest case importance coefficient among case importance coefficients of the litigation cases data as important case data, (1-2) forming key patent data from patents referred by the important case data, (1-3) searching the key patent data to obtain the patent family corresponding to the key patent data and to obtain the members of the patent family and the priorities claimed by the members of the patent family and, (1-4) establishing the data set based on the members of the patent family and the priorities claimed by the members of the patent family.

The present invention further provides a system for evaluating/analyzing patent portfolio using patent priority. The system comprises a data storage unit for storing litigation cases data, a key patent screening unit for selecting one of the litigation case data that has a largest case importance coefficient among case importance coefficients of the litigation case data stored in the data storage unit as important case data and forming key patent data from patents referred by the important case data, a data set unit for searching the key patent data to obtain patent family corresponding to the key patent data and to obtain members of the patent family and priorities claimed by the members of the patent family so as to establish data set based on the members of the patent family and the priorities claimed by the members of the patent family and, a data analysis unit for analyzing or calculating the data set to obtain a critical chain, a significant chain or at least one core patent candidate through approaches of a priority relationship matrix, priority cumulating or priority screening so as to perform patent evaluation or patent portfolio according to the critical chain, the significant chain or the core patent candidate(s).

Compared to prior art, the method and system for evaluating/analyzing patent portfolio using patent priority approach of the present invention evaluate a patent portfolio having high importance, high value and high techniques by using the relationship between patent family members and their claimed priorities, and thus facilitate a patentee to perform patent evaluation, patent portfolio, patent application and patent maintenance and therefore, solve problems encountered by prior art of which evaluating patent and its overall effectiveness is hard for the patentee.

DETAILED DESCRIPTION OF PREFERRED EMBODIMENTS

Since information provided by patent family may be various application, the present invention provides a Patent Priority Approach (PPA) on the basis of network structure consisting of priority of patent family to make up deficiencies generated by patent citation network such that a company can have more detailed planning with respect to patent portfolio.

Relating PPA, a key patent is found from patent litigation cases, and a network structure of patent family is formed by the key patent. The present invention analyzes patent cases and their claimed priorities (i.e., claimed patent) and thus constitutes a Patent Priority Network (PPN). This kind of PPN is different from a patent citation network. Technique development route and technique development duration may be observed through the PPN. Portfolio condition of core patents may be judged by a number of times of claimed priorities. Moreover, this approach is focused on strategy layout inside a company (a patentee) and thus much more beneficial to patent portfolio analysis.

Figure 1:
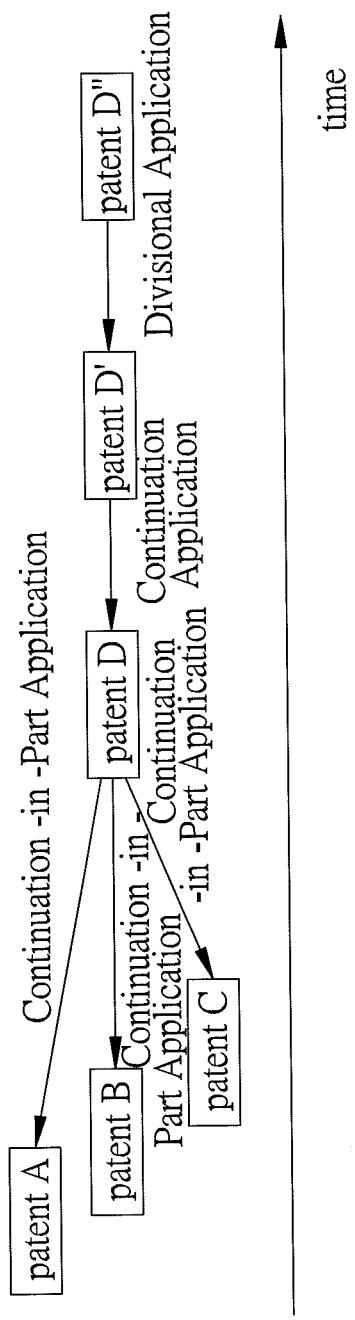
FIG. 1 illustrates a schematic diagram of a relationship between patent family members.

The present invention arranges priority patent claimed by each member on the basis of application date to form a series of priority patent portfolio called a patent chain. The patent chain represents a development route of related technique of family members. An amount of these priorities is called generation number. FIG. 1 illustrates related concepts of priority patent, wherein family member D" and its claimed priorities A, B, C, D and D' form a network flow chart, wherein D" claims priority D', while D' claims priority D, additionally D claims sequentially priority A, B and C. FIG. 1 illustrates a priority portfolio claimed by patent D", that is, the content of its patent chain is {A, B, C, D and D'} and, D" claims five priorities. Therefore, the generation number is five, and it means that D" is extended through this five priority.

Since the relationship "advocate" or "claimed" between patent family member and its claimed priority is only considered, priority network structure may be illustrated by two types on the basis of Patent Family-Based (PFB) and Priority Patent-Based (PPB). PFB is a set of patent family members claiming priority and is represented by set $PF=\{pf_1, pf_2, \ldots, pf_m\}$ while PPB is a set of claimed priority members and is represented by set $PP=\{pp_1, pp_2, \ldots, pp_n\}$. The concept of PFB and PPB is explained in the following description in conjunction with FIG. 2.

Figure 2A:
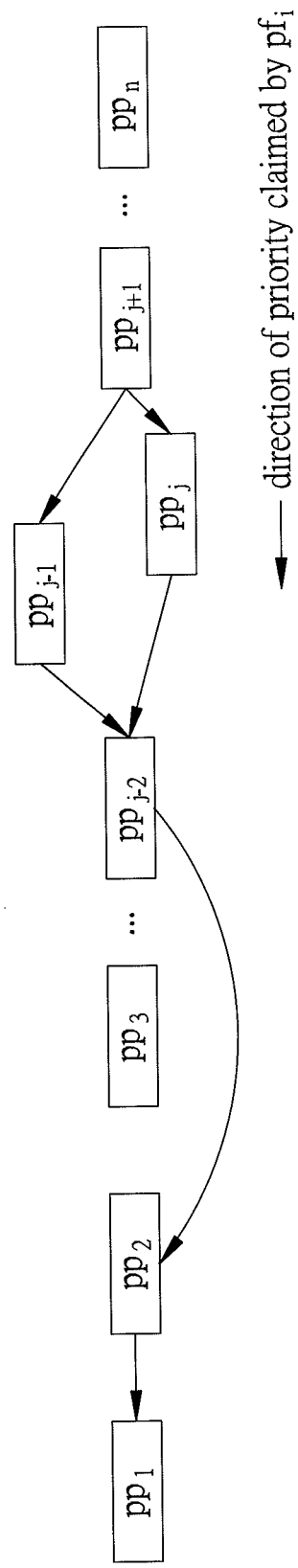
FIG. 2(a) illustrates a schematic diagram of Patent Family-Base (PFB) concept presenting priority claimed by patent family member $pf_i$.

FIG. 2a illustrates a concept of PFB. In the patent family set PF, the amount of claimed priority PP is n, wherein the $i^{th}$ patent family member $pf_i$ is used to be an example for discussion ($1 \leq i \leq m$, i is not greater than amount of family member m). This figure represents the priority claimed by $pf_i$, wherein it is shown on the patent chain of $pf_i$ that $pf_i$ claims $pp_{j+1}$ for priority, $pp_{j+1}$ claims $pp_j$ and $pp_{j-1}$ for priority, $pp_j$ and $pp_{j-1}$ both claim $pp_{j-2}$ for priority, $pp_{j-2}$ claims $pp_2$ for priority, $pp_2$ claims $pp_1$ for priority. If there is claimed connection between any two priorities, an arrow is used to connect them, otherwise, no arrow. Therefore, when patent pot is in the patent application, it totally claims six priorities ordered according to time, that is, $\{pp_1, pp_2, pp_{j-2}, pp_{j-1}, pp_j, pp_{j+1}\}$ which is a patent chain of pt. Hence, it is inferred that the claim of $pf_i$ is innovatively extended from this six priority patents $\{pp_1, pp_2, pp_{j-2}, pp_{j-1}, pp_j, pp_{j+1}\}$ and the generation number of $pf_i$ is six.

Figure 2B:
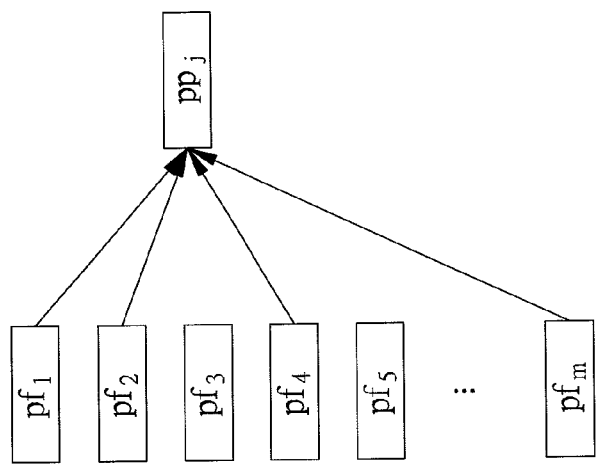
FIG. 2(b) illustrates a schematic diagram of Priority Patent-based (PPB) concept presenting priority $pp_j$ being claimed by four family members.

FIG. 2b illustrates a concept of PPB. In terms of the $j^{th}$ priority $pp_j$ ($1 \leq j \leq n$) of priority set PP, it is a priority commonly claimed by four patents $\{pf_1, pf_2, pf_4, pf_m\}$ of patent family set PF. Therefore, the number of times of that $pp_j$ is claimed for priority is four.

Figure 3:
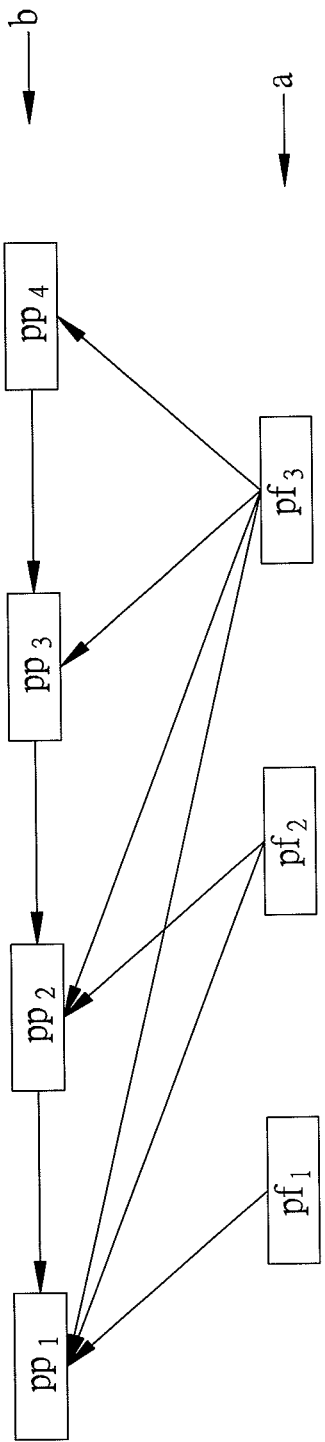
FIG. 3 illustrates a schematic diagram of Patent Priority Approach (PPA) concept.

The present invention provides PPA on the basis of these two previously described layout approaches. As illustrated in FIG. 3, $pf_1$-$pf_3$ are partial members of some patent family PF and, $pp_1$-$pp_4$ are partial priority claimed by these patent family members. Known from this figure, generation number of patent chain is four and, three family members $pf_1$-$pf_3$ form a patent family by commonly claiming priority $pp_1$, wherein the number of times of that $pp_1$ is repeatedly claimed is the greatest, that is, three times, while this means that larger proportion of the patent family is innovatively continued from $pp_1$.

It represents that generation number is greater when patent chain length is longer by analyzing claimed priority amount of each patent chain (i.e., generation number), i.e., the number of continuation times of the patent chain on development is greater and, patent or its technique on the patent chain has more opportunities of research and design, which may present innovation depth of the patent. Moreover, the number of repeated claiming times of each priority presents reference degree of the patent. If the number of claiming times of the priority is more, the patent has basic or greater influence and, it also presents innovation scope of the patent.

PPA of the present invention begins with dispute patent in litigation case and, analyzes patent portfolio direction or strategy of a company through finding related patent family and priority relationship between members of the patent family. A critical chain and a significant chain of a patent family is further found by previous described patent chain analysis, wherein a member (patent) having the greatest number of times of claimed priority in all patent family members is found, and a set of all priority claimed by the patent during prosecution will constitute a patent chain which is called the critical chain generally meaning that technique development on the patent chain has the longest history and is continuously studied later while the technique has the deepest scalability or is improved. In addition, so-called significant chain refers to that the total number of patent on a patent chain repeatedly claimed for priority is the greatest in all patent chains. It represents that the patent has significance affecting research development of other patent. It should additionally formulates a screening requirement with respect to the number of repeatedly claimed times of priority in the development process of the significant chain. The screening requirement is used to determine which patent has potential of becoming a technique core of company research or utilization for patent planning portfolio. This screening method is called a screening rule of core patent candidates.

Figure 4:
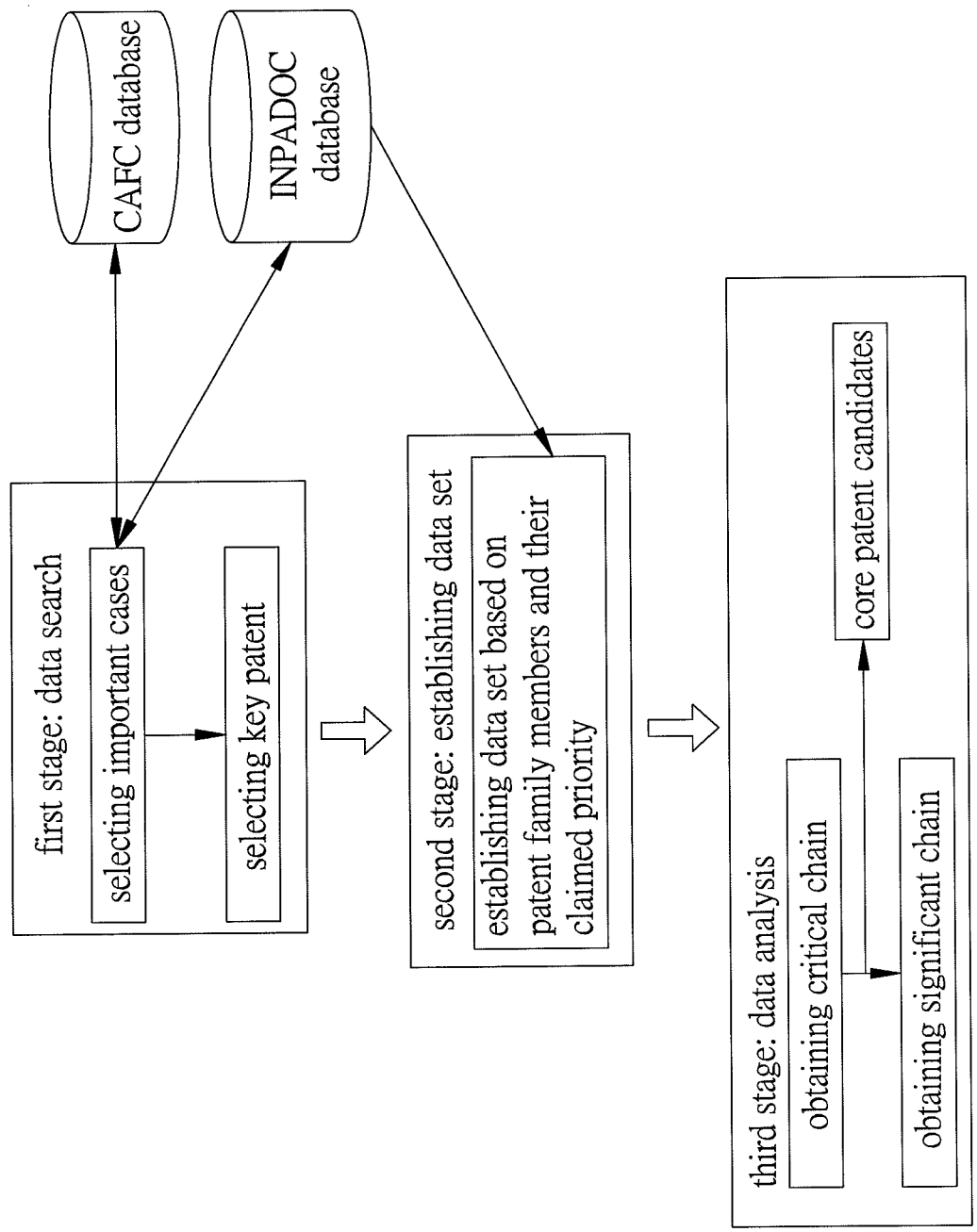
FIG. 4 illustrates a schematic diagram of each stage of a process of PPA.

In addition, the analysis process of PPA may be divided into three stages which include data search, data set establishment and data analysis. Generally, required data is screened and searched in litigation case database and patent database, the data is analyzed to establish data set, and a critical chain, a significant chain and possible core patent candidate(s) are obtained through the data analysis of the data set, wherein its process is shown in FIG. 4.

As previous description, PPA may be divided into three stages which include data search, data set establishment and data analysis, wherein the data search stage may be further divided into two parts of important case selection and key patent selection. Each patent has different value in each stage of its life cycle. Hence, it further shows that patent has its importance if the patent experiences litigation process. Generally, it will find that a dispute patent comes from the same patent family by analyzing the dispute patent mentioned inside a litigation case. This shows that the patent family is formed through considerably planned layout. Therefore, one representative patent is chosen herein as a key patent for facilitating the collection of relevant data so as to establish data set.

A patent litigation case is first searched in the Court of Appeals for the Federal Circuit (CAFC), and any law case database (for instance, LexisNexis, WestLaw, and etc. all having case text of CAFC) is chosen for performing search. It will obtain s cases and, initial analysis is performed. The $i^{th}$ case is represented by $LA_i$, $LA_i=(o(N_i), P_i)$, which contains:

$$LA_i = \{o(N_i), p_{i1}, p_{i2}, \ldots, p_{in_i}\}, i=1,2,\ldots,s \quad (1)$$

Wherein $o(N_i)$ represents the amount of litigants in the $i^{th}$ case, $P_i=\{p_{i1}, p_{i2}, \ldots, p_{in_i}\}$, $i=1,2,\ldots,s$, represents the patent number of dispute patent in the $i^{th}$ case, $N_i$ represents the litigants in the case, wherein the amount of litigants is the summation of plaintiff and defendant.

Given the patent number, $p_{ij}$, of any dispute patent in each case $LA_i$, $j=1,2,\ldots,n_i$, $p_{ij}$ is the $j^{th}$ element in the set $\{p_{i1}, p_{i2}, \ldots, p_{in_i}\}$. Any dispute patent number involved in each case $LA_i$ is used as a keyword. Searching the scope of its patent family in INPADOC may obtain the size of patent family members set $F_i$, the size of which is $o(F_i)$, $i=1, 2, \ldots, s$. As previously described, dispute patent numbers are usually all from the same patent family. Hence, the size of patent family searched from any dispute patent is the same.

The previous equation (1) and above steps are combined and, patent family information obtained by searching CAFC cases and INPADOC database is integrated. After arrangement, it may obtain case set $L_i$, shown as equation (2):

$$L_i=(o(N_i), P_i, (o(F_i)), i=1,2,\ldots,s \quad (2),$$

wherein it comprises three data items which include the amount of litigant of both sides $o(N_i)$, patent number set of dispute patent, $P_i=\{p_{i1}, p_{i2}, \ldots, p_{in_i}\}$, and size of patent family $o(F_i)$ (i.e., amount of family members). $o(N_i)$ and $o(F_i)$ are the respective counts of the elements in sets $N_i$ and $F_i$.

Next, a case importance coefficient $LPF_i$ of each case is calculated. If the amount of plaintiff and defendant is greater, it means that the litigation case involves more parties and has the higher level impact, and it shows the importance of this patent. Hence, the multiplying result of the amount of litigants $o(N_i)$ of each litigation case and the size of patent family members $o(F_i)$ is used as a judgment index $LPF_i$ of importance of each case, shown as equation (3) and, the value of i which maximizes $LPF_i$ is denoted as i*, shown as equation (4):

$$LPF_i = o(N_i) \cdot o(F_i), i = 1, 2, \ldots, s \quad (3)$$

$$LPF_{i*} \underset{1 \leq i \leq s}{\text{Max}} LPF_i \quad (4)$$

Consequently, the $i^{th}$ litigation case referred by $LPF_{i*}$ is an important case $L_{i*}$, shown as equation (5), which will be an analysis subject of the following key patent selection.

$$L_{i*}=(o(N_{i*}), P_{i*}, o(F_{i*})) \quad (5)$$

The set of $n_{i*}$ dispute patents, $$P_{i*} = \{p_{i*1}, p_{i*2}, \ldots, p_{i*n_{i*}}\},$$

involved in the case may be obtained through the content of important case. And these dispute patents $P_{i*}$ form a patent family due to relationship of commonly claimed priority. Generally, in a case, one patent is often assigned as a representative of all dispute patent to continuously describe case content. For example, it assigns the $j^{*th}$ patent $P_{i*j*}$, in order to provide a representative of all disputed patents $$\{p_{i*1}, p_{i*2}, \ldots, p_{i*n_{i*}}\}.$$

We regard $P_{i*j*}$ as the key patent, as a basis of data set establishment later.

Figure 5:
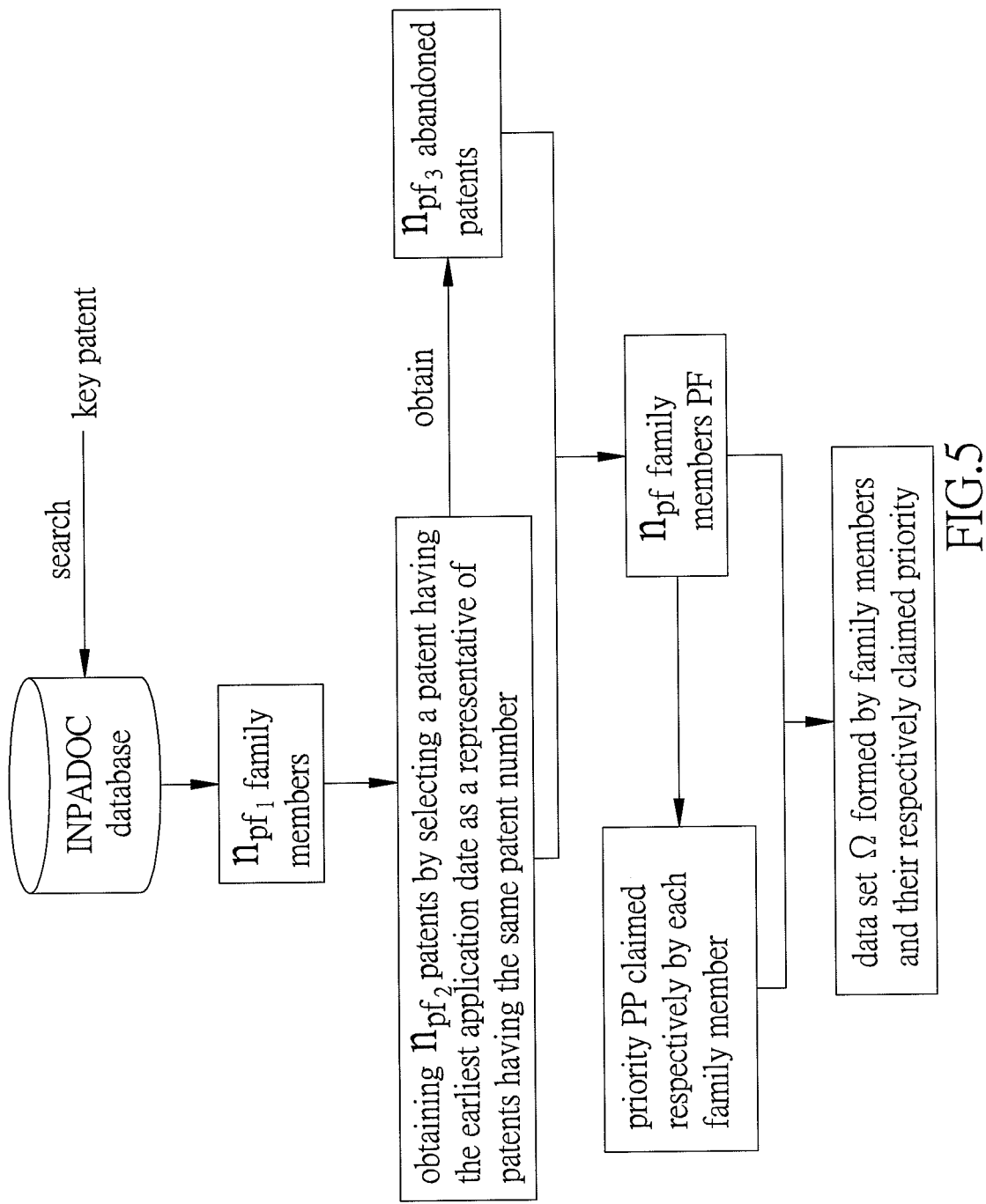
FIG. 5 illustrates a schematic diagram of a data set establishment process of PPA.

The key patent $P_{i*j*}$ is found by accomplishing the previous approach. Next, data set is established. Its patent family is found via the key patent. After arrangement, it establishes required data set with respect to claimed priority. The approximate process is illustrated in FIG. 5.

Patent family of $P_{i*j*}$ is searched and obtained in INPADOC database by enabling $P_{i*j*}$ as a subject, wherein the size of the family members is $n_{pf1}$.

However, different kind codes may occur due to different application state in the patent family members obtained by the previous searching approach while these codes belong to the same patent. Therefore, these patent having the same patent number while having different kind of codes is screened and arranged. It may obtain $n_{pf2}$ patents by assigning the patent having the earliest application date as a representative while deleting others if necessary. And its size will not be greater than the original size of family members, that is, $n_{pf2} \leq n_{pf1}$.

Additionally, the patent searched from INPADOC database does not comprise abandoned patent. However, the patent which is applied before but abandoned later is necessary for patent layout of a company. Therefore, the abandoned patent is found by the content of $n_{pf2}$ searched specification and, its size is set to be $n_{pf3}$.

Arranged patent family having $n_{pf}$ members may be obtained by integrating $n_{pf2}$ and $n_{pf3}$ patents. The patents of the same country are herein ordered on the basis of application date to facilitate later data analysis and to clearly know the sequence of patent application (patent deployment). The patent family member is represented by $PF_i$, wherein $i=1, 2, \ldots, n_{pf}$, $n_{pf}=n_{p/2}+n_{p/3}$.

Each family member $PF_i$, $i=1, 2, \ldots, n_{pf}$, has respective claimed and different amount of priority $PP_{ik}$ according to different application relationship with respect to a parent case. Next, $n_{pp}$ priority patent may be obtained by integrating the same claimed priority of each family member. Similarly, the order is $pp_1, pp_2, \ldots, pp_{n_{pp}}$ according to their application dates. Additionally, it sets $PPB_j=pp_j$, $j=1, 2, \ldots, n_{pp}$, wherein PPB represents all arranged priorities of the family. A data set $\Omega$ is established by the family members $PF_i$ and claimed priority $PP_{ik}$. The data set is shown as equation (6):

$$\Omega=\{PF_i, PP_{ik}\}, i=1, 2, \ldots, n_{pf}\ k=1, 2, \ldots, n_i, \quad 1 \leq n_i \leq n_{pp} \quad (6)$$

Steps of above data search and data set establishment are all for obtaining the data set $\Omega$ required by PPA in accordance with the present invention. Next, the data set $\Omega$ is analyzed to find out the critical chain, the significant chain and that which of patent may be core patent candidate(s) inside all patent chains in the patent family.

It establishes a relationship matrix represented by $R=\lfloor r_{ij} \rfloor_{n_{pf} * n_{pp}}$ being between patent family member $PF_i$ and its claimed priority $PP_{ik}$ via data comprised by the data set $\Omega$, wherein, $$r_{ij} = \begin{cases} 1 & PP_{ik} = PPB_j \\ 0 & \text{otherwise} \end{cases} \quad (7)$$

$$i = 1, 2, \ldots, n_{pf},$$
$$j = 1, 2, \ldots, n_{pp},$$
$$k = 1, 2, \ldots, n_i$$

In terms of the $i^{th}$ family member $PF_i$ in the patent family, the amount of the priority $PP_{ik}$ claimed by the family member is $GR_i$, which is called generation number, represents the length of the patent chain, and is shown as equation (8), while the largest one $GR_{i*}$ is found from all $GR_i$ and shown as equation (9):

$$GR_i = \sum_{j=1}^{n_{pp}} r_{ij}, i = 1, 2, \ldots, n_{pf} \quad (8)$$

$$GR_{i*} = \max_{1 \leq i \leq n_{pf}} GR_i \quad (9)$$

$GR_{i*}$ described in the above equation (9) represents that the size of the priority claimed by the $i^{th}$ patent family member is the greatest. Hence, its generation number is the greatest and, its corresponding patent chain is the longest. The priority portfolio claimed by the family member is the critical chain $PP_{i*j}$, $j=1, 2, \ldots, n_{i*}$, shown as equation (10):

$$PP_{i*j} = \{pp_{i*1}, pp_{i*2}, \ldots, pp_{i*n_{i*}}\} \quad (10)$$

Additionally, calculating cumulative number of each claimed priority $PP_j$ according to relationship matrix R of equation (7) may obtain cumulative number matrix $SR=\lfloor sr_{ij} \rfloor_{n_{pf}*n_{pp}}$, wherein, $$sr_{ij} = \begin{cases} \sum_{k=1}^{i} r_{kj} & r_{ij} = 1 \\ 0 & r_{ij} = 0, \end{cases} \quad (11)$$

$$i = 1, 2, \ldots, n_{pf}, j = 1, 2, \ldots, n_{pp},$$

wherein calculating cumulative number of row of priority $PP_j$ claimed by the $i^{th}$ patent family member $PF_i$ in the cumulative number matrix SR may obtain column matrix SSR shown as equation (12):

$$SSR_i = \sum_{j=1}^{n_{pp}} sr_{ij}, i = 1, 2, \ldots, n_{pf} \quad (12)$$

Additionally, calculating cumulative number of column of priority $PP_{ik}$ claimed by the $i^{th}$ patent family member PF; in the cumulative number matrix SR may obtain row matrix TR shown as equation (13):

$$TR_j = \sum_{i=1}^{n_{pf}} sr_{ij}, j = 1, 2, \ldots, n_{pp} \quad (13)$$

The number of repeatedly claimed times of priority $PP_j$ may be obtain by the calculation result of $TR_j$ of equation (13). If its number of repeatedly claimed times achieves certain times c or above, it is called a core patent candidate and, its screening rule is shown as equation (14):

$$TR_j \square c, j=1, 2, \ldots, n_{pp}, c \square 2 \quad (14),$$

wherein c is a threshold of core patent candidate screening, represents the number of times of repeatedly claimed priority, and shows significance and influence of the priority. It judges that which of patent has the potential to be a key point for research or patent portfolio strategy of a company via the screening rule.

Setting $c \square 2$ herein means that these priorities were repeatedly claimed and thus have a certain status with respect to patent portfolio of a company. While the value of c is greater, it represents that the patent is closer to technique core or source of technique. Moreover, it may compare merits of patent via different thresholds and then determine the value of c. The judgment approach of that priority exceeding threshold may be core technique or research key is called a screening rule of core patent candidate(s) by analyzing the number of repeatedly claimed times of priority.

In addition, the greatest $SSR_{1*}$ is found from $SSR_i$ of equation (12) and $i*$ is the value of i that maximizes the $SSR_i$ value. $SSR_{i*}$ is shown as equation (15):

$$SSR_{i*} = \max_{1 \leq i \leq n_{pf}} SSR_i, \quad (15)$$

wherein $SSR_{i*}$ represents the $i^{th}$ patent family member $PF_{i*}$, and the cumulative number summation of its all claimed priority is the greatest, that is, the summation of repeatedly claimed times of these priority are the greatest. The i* patent chain $PP_{i*j}$ is called a significant chain, $j=1, 2, \ldots, n_{i*}$, shown as equation (16):

$$PP_{i*j} = \{pp_{i*1}, pp_{i*2}, \cdots, pp_{i*n_{i*}}\} \quad (16)$$

Figure 6:
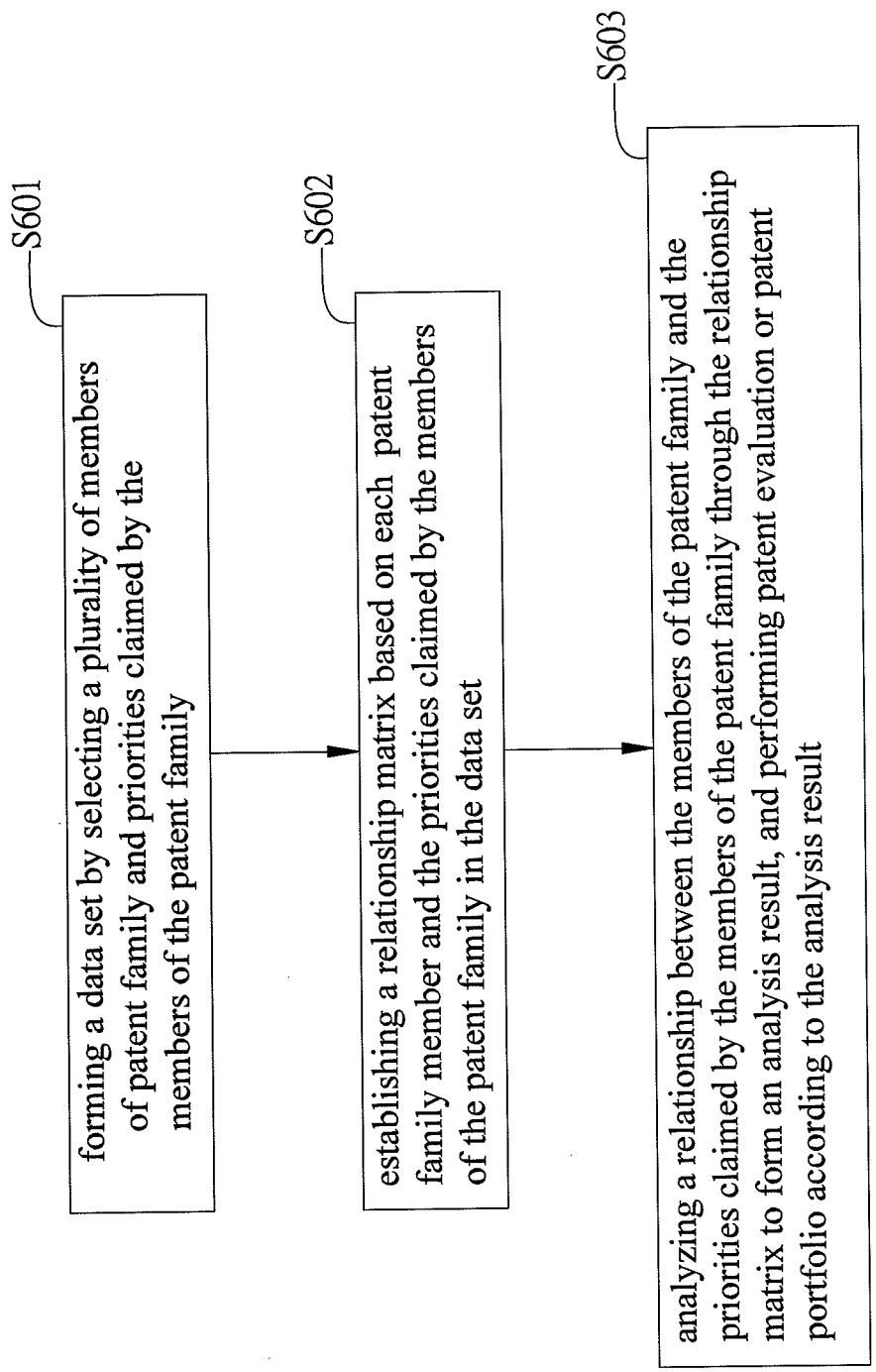
FIG. 6 illustrates a flow chart of a method for evaluating/analyzing patent portfolio using patent priority in accordance with the present invention.

Hence, using PPA to analyze the relationship between patent family member and its claimed priority so as to obtain high valuable patent portfolio may be represented via a flow chart in FIG. 6.

In step S601, a patent family is chosen for enabling members of the patent family and priority claimed by the members of the patent family to be established as a data set.

In step S602, a relationship matrix is formed by each patent family member and priority claimed by the member of the patent family in the data set.

In step S603, it analyzes the relationship between the members of the patent family and priority claimed by the members of the patent family via the relationship matrix so as to form an analysis result. Then, patent evaluation or patent portfolio is performed according to the analysis result.

In a preferred embodiment, step S601 may be performed by the following approach. First, one of the litigation case data is selected that has a greatest case importance coefficient among case importance coefficients of the litigation case data. Then, key patent data is formed from patent involved in the important case data. Next, the key patent data is searched to obtain a member of patent family corresponding to the key patent data and then priority claimed by the member of the patent family. At last, the data set is formed by the members of the patent family and priority claimed by the members of the patent family, wherein the case importance coefficient may be obtained by multiplying the amount of affiliates of the litigation case data with the amount of patent family member.

Figure 7:
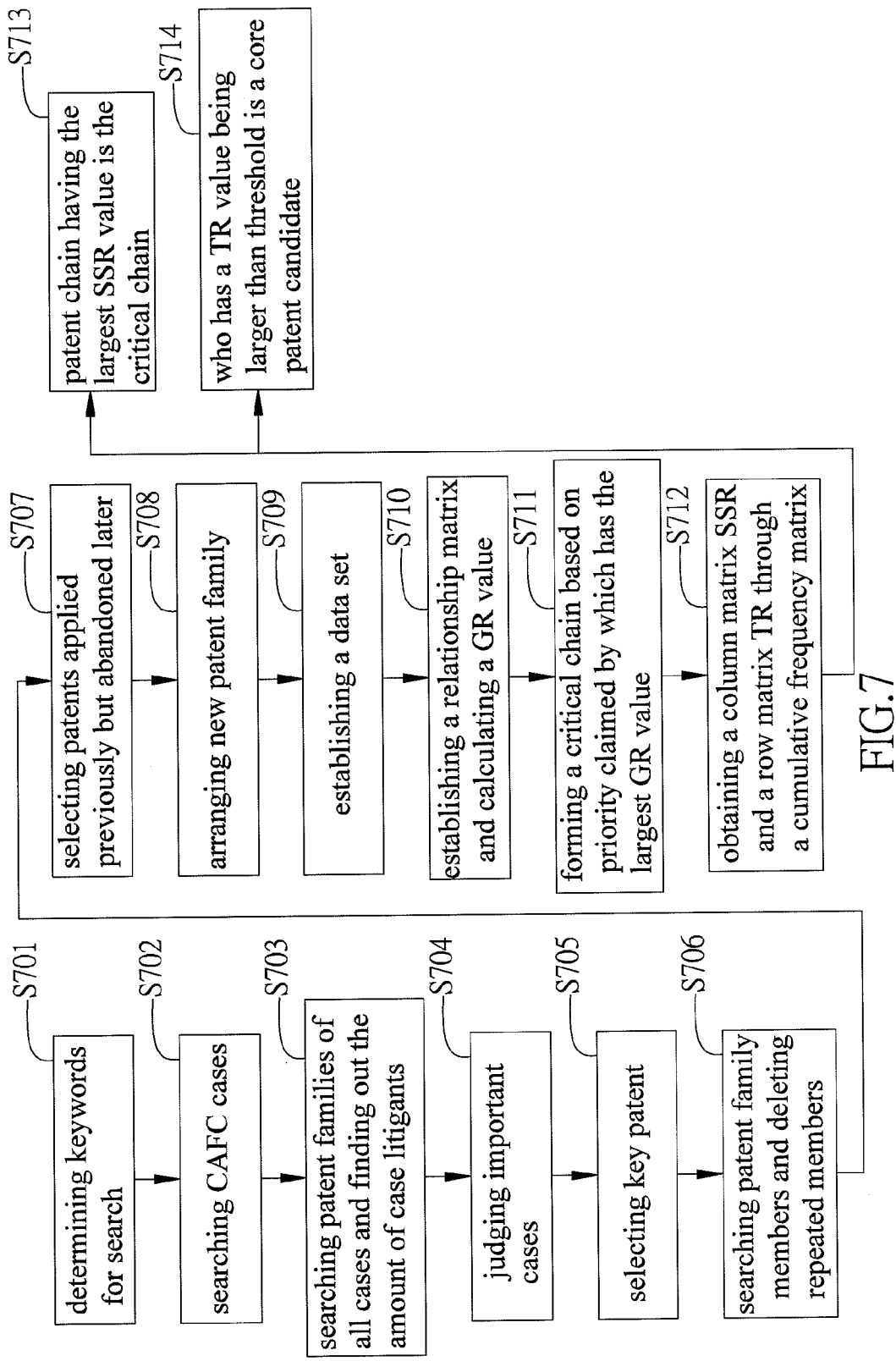
FIG. 7 illustrates a flow chart of a process of applying the method for evaluating/analyzing patent portfolio using patent priority to find out a critical chain, a significant chain and core patent candidate(s) in accordance with the present invention.

As illustrated in FIG. 7, a flow chart is to find out a critical chain, a significant chain and core patent candidate(s) by applying the method for evaluating/analyzing patent portfolio using patent priority approach in accordance with the present invention. Its detailed steps are illustrated below.

In step S701, first, a company with litigation cases is determined to be a subject by using company name, product name, "patent" and etc. as keywords. In step S702, it searches in a law database storing CAFC (not limited) case text through these keywords. In step S703, it chooses any dispute patent from each case and searches the patent family in INPADOC database (not limited). In step S704, case importance coefficient is obtained by multiplying the amount of litigants with the amount of patent family members in the case, wherein the greatest one of the case importance coefficient is considered an important case data. In step S705, any dispute patent is found from the important case data to be key patent.

In step S706, members of the patent family are searched in INPADOC database (not limited) via the key patent, and members of the same patent having different kind codes are screened to leave the member having the earliest application date and to delete the others so as to avoid repetition while the amount of left members are not necessarily greater than the amount of original family members. Additionally, in step S707, a patent which is applied before but abandoned later in the patent family is searched. In step S708, a new patent family is formed by arranging and integrating the previous both. In step S709, all priority claimed by the member of the new patent family is found to establish data set via a member of these family and priority claimed by the member.

In step S710, a relationship matrix R between patent family members and priorities claimed by the members is established and, GR value is calculated, wherein the GR value represents the amount of priority claimed by the member. In step S711, a member of patent family corresponding to the largest one of GR value is found and, priority claimed by the member is formed as a critical chain. In step S712, a column matrix SSR and a row matrix TR are obtained via a cumulative number matrix SR, wherein TR value represents the number of repeatedly claimed times of priorities and, SSR value is the number of times of that priorities claimed by members of the patent family is repeatedly claimed by other members of patent family. In step S713, when TR value is greater than a threshold (that the threshold c□2 is set in the present invention), the priority is called a core patent candidate. In step S714, priority claimed by a family member having the greatest SSR value forms a significant chain.

Information of the critical chain, the significant chain, the core patent candidate(s) and etc. in patent family is found via the previously described PPA which is on the basis of priority relationship between members of patent family and according to the amount of claimed priority in each patent chain, cumulative number of that priority is claimed and the number of repeatedly claimed times of priorities, wherein the information facilitates research of patent portfolio.

Figure 8:
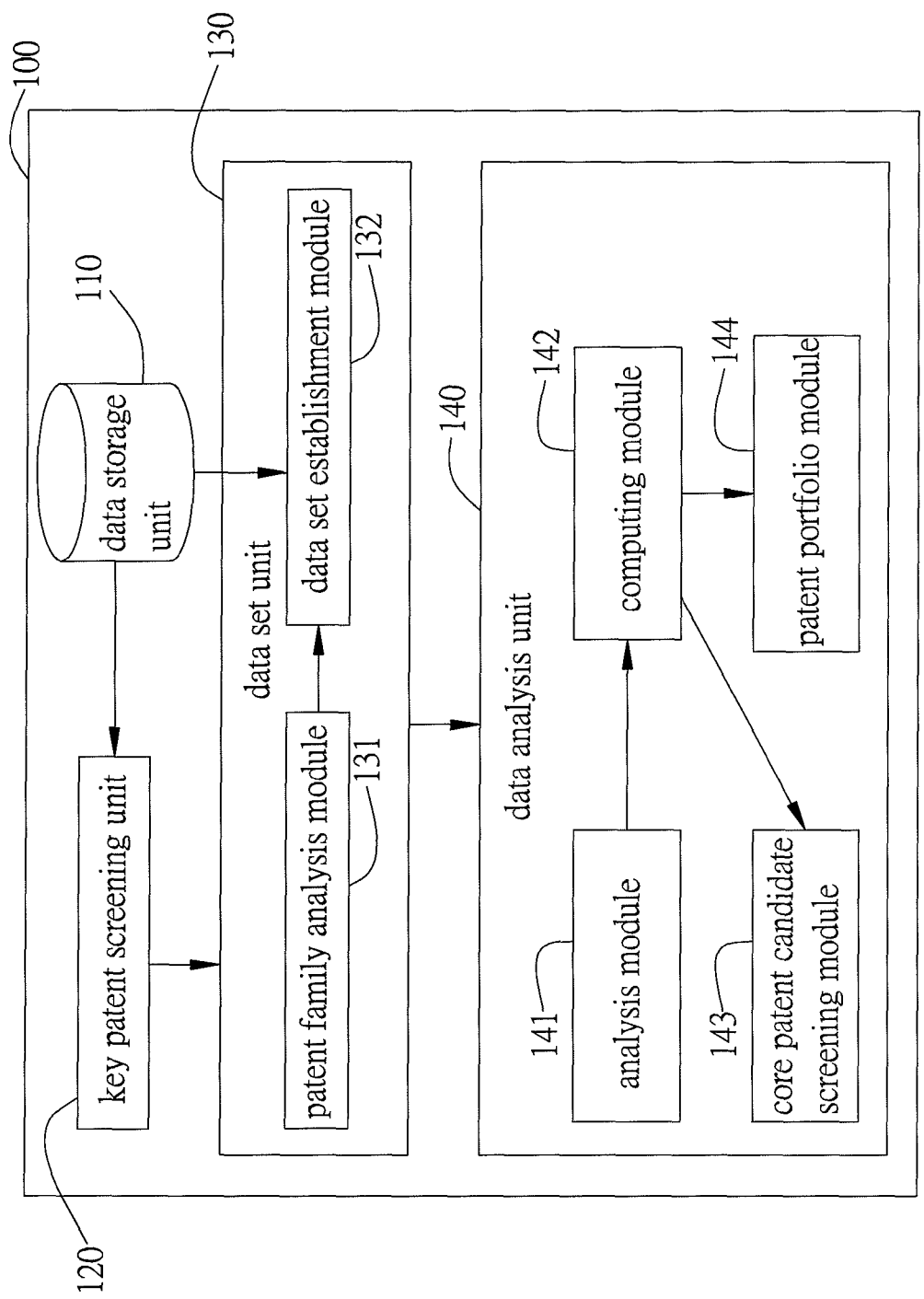
FIG. 8 illustrates a system block diagram of a basic architecture of a system for evaluating/analyzing patent portfolio using patent priority in accordance with the present invention.

FIG. 8 illustrates a basic architecture of a system for evaluating/analyzing patent portfolio using patent priority approach, wherein the system 100 for evaluating/analyzing patent portfolio comprises a data storage unit 110, a key patent screening unit 120, a data set unit 130 and a data analysis unit 140.

The data storage unit 110 is used to store litigation case data or patent family member data of their dispute patents searched in litigation case database (such as LexisNexis) and patent database (such as INPADOC). Then the data is transmitted to the key patent screening unit 120 for being analyzed and screened. The key patent screening unit 120 obtains an important case according to case importance coefficient and uses one dispute patent in the important case as a key patent so as to facilitate data set establishment later.

The data set unit 130 is primarily used to receive the key patent data and to obtain its patent family, and to establish data set by analyzing and constituting another patent family. The data set unit 130 comprises a patent family analysis module 131 and a data set establishment module 132. The patent family analysis module 131 is used to analyze patent family of the key patent and to delete patent having the same patent number but different kind while taking one as a representative. The data set establishment module 132 is primarily used to constitute another patent family through summing data analyzed by the patent family analysis module 131 and patent applied before but abandoned later in the patent family and, to constitute data set via the patent family data, wherein the data set is comprised by the patent family member and its claimed priority.

The data analysis unit 140 is used to receive the data set and to obtain a critical chain, a significant chain and core patent candidate(s) in patent family via analysis and calculation of priority relationship, cumulative number, screening threshold and etc. The data analysis unit 140 comprises an analysis module 141, a computing module 142, a core patent candidate screening module 143 and a patent portfolio module 144. The analysis module 141 analyzes the data set via relationship matrix to obtain a relationship between the patent family member and its claimed priority. The computing module 142 calculates the relationship between each family member and its claimed priority and performs cumulative calculation via relationship cumulative matrix. The core patent candidate screening module 143 sets a threshold for screening core patent candidate(s). The patent portfolio module 144 is used to analyze the result of the computing module 142, wherein calculation results of the number of claimed times of priority, the number of repeatedly claimed times of priority, cumulative number of the number of times of repeated advocacy and etc. are analyzed. The critical chain and significant chain in patent family may be obtained to perform the following patent evaluation or patent portfolio after analysis of the patent portfolio module 144.

In a preferred embodiment, the above described data storage unit, key patent screening unit, data set unit and data analysis unit may be realized in computer software form, wherein the computer software is disposed in storage media such as disc, hard disc drive or memory.

The previous description is a system architecture for evaluating/analyzing patent portfolio using patent priority approach in accordance with the present invention. When relevant data of litigation case is provided for the system, the system will evaluate/analyze the patent family and provide merits of the patent portfolio. Besides, it may further realize the strategy of the patent owner with respect to the patent portfolio. Therefore, it is more worthy than evaluation of traditional patent citation approach with respect to patent portfolio.

The present invention provides a patent priority approach based on patent priority to be able to remedy the deficiencies of patent citation network analysis through a priority network analysis approach based on patent family priority. It may enable patent portfolio planning more perfect and enable patent portfolio to achieve more benefit via a critical chain, significant chain and core patent candidate(s) in patent family. On the other hand, it may clearly understand core technique development process of a company, evaluate layout merits and even infer future layout direction, that is, all facilitates to patent portfolio application.

The foregoing descriptions of the detailed embodiments are only exemplarily illustrated to disclose the features and functions of the present invention and not restrictive of the scope of the present invention. One skilled in the art could modify and vary the previous embodiments without violating the spirit and principle of the present invention. Hence, the protection scope of the present invention should fall within the scope of the appended claims.

What is claimed is:

1. A method for evaluating/analyzing patent portfolio using patent priorities, wherein the method is implemented to evaluate a patent family by a computer, comprising:
    (1) selecting, by the computer, the patent family, and establishing a data set based on members of the patent family and priorities claimed by the members of the patent family, wherein the data set is stored in the computer;
    (2) forming, by the computer, a relationship matrix based on the members of the patent family and the priorities claimed by the members of the patent family in the data set; and
    (3) analyzing, by the computer, a priority relationship between the members of the patent family and the priorities claimed by the members of the patent family through the relationship matrix, and calculating a generation number and the number of claimed times of priority in the relationship matrix to obtain a critical chain, a significant chain, and a core patent candidate for performing patent evaluation or establishment of patent portfolio,
    wherein the step (1) comprises:
    (1-1) selecting one of a plurality of litigation case data that has a greatest case importance coefficient among case importance coefficients of the litigation cases data as important case data, and
    wherein the case importance coefficient is obtained by multiplying an amount of affiliates in the litigation case data with another size of the members of the patent family.

2. The method of claim 1, wherein step (1) further comprises:
    (1-2) forming key patent data from patents referred by the important case data;
    (1-3) searching the key patent data to obtain the patent family corresponding to the key patent data and to obtain the members of the patent family and the priorities claimed by the members of the patent family; and
    (1-4) establishing the data set based on the members of the patent family and the priorities claimed by the members of the patent family.

3. The system of claim 1, wherein the relationship matrix of step (2) is represented by $\lfloor r_{ij} \rfloor$, wherein i represents one of the members of the patent family, j represents one of the priorities claimed by the members of the patent family, and $\lfloor r_{ij} \rfloor$ equals to 1 if the $i^{th}$ member of the patent family claims the $j^{th}$ priority, or equals to 0.

4. The method of claim 3, wherein the amount of the priorities claimed by the ith member of the patent family is generation number GRi and, the largest one GRi, is selected from all GRi to represent that the amount of priorities claimed by the i*th member of the patent family greater than those of the other members of patent family.

5. The method of claim 4, wherein the generation number $GR_i$ are used to judge innovation and maturity of techniques of the $i^{th}$ member of the patent family.

6. The method of claim 4, further comprising forming the critical chain based on all priorities claimed by the i*$^{th}$ member of the patent family to perform the patent evaluation or the patent portfolio according to the critical chain.

7. The method of claim 1, wherein step (3) further comprises:
    (3-1) calculating a cumulative number of each priority in the relationship matrix being claimed to form a cumulative number matrix;
    (3-2) calculating a cumulative sum of columns and rows of the cumulative number matrix to obtain a row matrix and a column matrix, respectively, wherein the row matrix represents a matrix of total number of times of the priority being repeatedly claimed, and the column matrix represents a matrix of total number of times of the priorities claimed by the members of the patent family being repeatedly claimed by the other members of patent family; and
    (3-3) selecting a member of the patent family having the largest value in the column matrix to form the significant chain based on all priorities claimed by the member of the patent family so as to perform the patent evaluation or the establishment of patent portfolio according to the significant chain.

8. The method of claim 7, wherein step (3-3) further selects priorities being claimed certain times or above as the core patent candidate through a screening rule.

9. The method of claim 7, wherein a matrix of the number of times of the priority being advocating is used to judge basis and significance of techniques of the priority.

10. A system for evaluating/analyzing patent portfolio using patent priorities, comprising:
    a data storage unit for storing a plurality of litigation case data;
    a key patent screening unit, comprising a first computer, for selecting one of the litigation case data that has a greatest case importance coefficient among case importance coefficients as important case data and forming key patent data from patents referred by the important case data;

a data set unit for searching the key patent data to obtain the patent family corresponding to the key patent data and to obtain members of the patent family and priorities claimed by the members of the patent family so as to establish a data set based on the members of the patent family and the priorities claimed by the members of the patent family, wherein the data set is stored in the computer; and a data analysis unit, comprising the computer, for analyzing or calculating the data set to obtain a critical chain, a significant chain or at least one core patent candidate through approaches of a priority relationship matrix, priority cumulating or priority screening to calculate a generation number and the number of claimed times of priority in the priority relationship matrix, so as to perform patent evaluation or establishment of patent portfolio according to the critical chain, the significant chain or the core patent candidate(s), wherein the data storage unit stores an amount of affiliates in the litigation case data and size of the members of the patent family being obtained via search while the case importance coefficient is obtained by multiplying the amount of affiliates in the litigation case data with the size of the members of the patent family.

11. The system of claim 10, wherein the data set unit comprises:

a patent family analysis module for analyzing the patent family corresponding to the key patent data to select members of the patent family all having the same patent number but different kind so as to consider one member of the patent family as a representative and delete other members; and a data set establishment module for adding members being applied before but abandoned later in the patent family corresponding to the key patent data to another patent family constituted by the patent family analysis module so as to constitute the data set based on members of the another patent family and priorities claimed by the members of the another patent family.

12. The system of claim 10, wherein the data analysis unit comprises:

an analysis module for forming a relationship matrix by analyzing the members of the patent family and the priorities claimed by the members of the patent family in the data set;

a computing module for calculating or cumulatively calculating the relationship matrix to obtain generation number, the number of times of the priority being repeatedly claimed and summation of the number of times of the priorities claimed by the members of the patent family being repeatedly claimed by the other members of patent family; and a patent portfolio module for forming the critical chain and the significant chain according to the generation number, the number of times of the priority being repeatedly claimed and the summation of the number of times of the priorities claimed by the members of the patent family being repeatedly claimed by the other members of patent family so as to perform the patent evaluation or the establishment of patent portfolio.

13. The system of claim 12, wherein the data analysis unit further comprises a core patent candidate screening module for selecting priority being claimed certain times or above as the core patent candidate(s) through a screening rule.

14. The system of claim 10, wherein the data storage unit, the key patent screening unit, the data set unit and the data analysis unit are realized in computer software form.

15. The system of claim 14, wherein the computer software is installed in storage media.

* * * * *